US012640670B2

(12) United States Patent
Haque et al.

(10) Patent No.: US 12,640,670 B2
(45) Date of Patent: May 26, 2026

(54) FEEDFORWARD CURRENT CONTROL OF INDUCTION MACHINES

(71) Applicant: Steering Solutions IP Holding Corporation, Saginaw, MI (US)

(72) Inventors: Moinul Haque, Saginaw, MI (US); Vignesh Kumar R C, Saginaw, MI (US); Prerit Pramod, Saginaw, MI (US); Krishna MPK Namburi, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 486 days.

(21) Appl. No.: 18/459,789

(22) Filed: Sep. 1, 2023

(65) Prior Publication Data

US 2025/0080018 A1 Mar. 6, 2025

(51) Int. Cl.
H02P 21/09 (2016.01)
H02P 21/14 (2016.01)

(52) U.S. Cl.
CPC ............ H02P 21/09 (2016.02); H02P 21/141 (2013.01); H02P 2207/01 (2013.01)

(58) Field of Classification Search
CPC ..... H02P 21/09; H02P 21/141; H02P 2207/01
See application file for complete search history.

(56) References Cited

U.S. PATENT DOCUMENTS

| | | | |
|---|---|---|---|
| 9,806,656 B1 | 10/2017 | Pramod | |
| 9,809,247 B2 | 11/2017 | Kleinau | |
| 10,003,285 B2 | 6/2018 | Pramod | |
| 10,097,120 B2 | 10/2018 | Pramod | |
| 10,103,667 B2 | 10/2018 | Pramod | |
| 10,333,445 B2 | 6/2019 | Pramod | |
| 10,340,827 B2 | 7/2019 | Pramod | |
| 10,340,828 B2 | 7/2019 | Pramod | |
| 10,404,197 B2 | 9/2019 | Pramod | |
| 10,411,634 B2 | 9/2019 | Pramod | |
| 10,717,463 B2 | 7/2020 | Pramod | |
| 10,822,024 B2 | 11/2020 | Pramod | |
| 10,960,922 B2 | 3/2021 | Pramod | |
| 11,091,193 B2 | 8/2021 | Pramod | |
| 11,177,752 B2 | 11/2021 | Pramod | |
| 11,180,186 B2 | 11/2021 | Pramod | |
| 11,218,096 B2 | 1/2022 | Pramod | |
| 11,736,048 B1 | 8/2023 | Pramod | |
| 12,528,535 B2 * | 1/2026 | Mori .................... | B62D 5/0463 |
| 2007/0222409 A1 * | 9/2007 | Kariatsumari .......... | H02P 21/06 |
| | | | 318/807 |
| 2013/0221885 A1 * | 8/2013 | Hunter .................... | H02P 21/18 |
| | | | 318/400.15 |

* cited by examiner

*Primary Examiner* — Zoheb S Imtiaz
(74) *Attorney, Agent, or Firm* — Dickinson Wright PLLC

(57) ABSTRACT

A method for controlling an induction machine includes: determining a forward path voltage command based on: a command current, the measured rotor position, and a set of estimated motor parameters regarding the induction machine; determining an estimated disturbance signal corresponding to a voltage generated in the induction machine due to rotor fluxes; determining a reference voltage signal based on both of the forward path voltage command and the estimated disturbance signal; and commanding, based on the reference voltage signal, an inverter to apply an output voltage to the induction machine and thereby causing an output current to be generated in a stator winding of the induction machine.

20 Claims, 9 Drawing Sheets

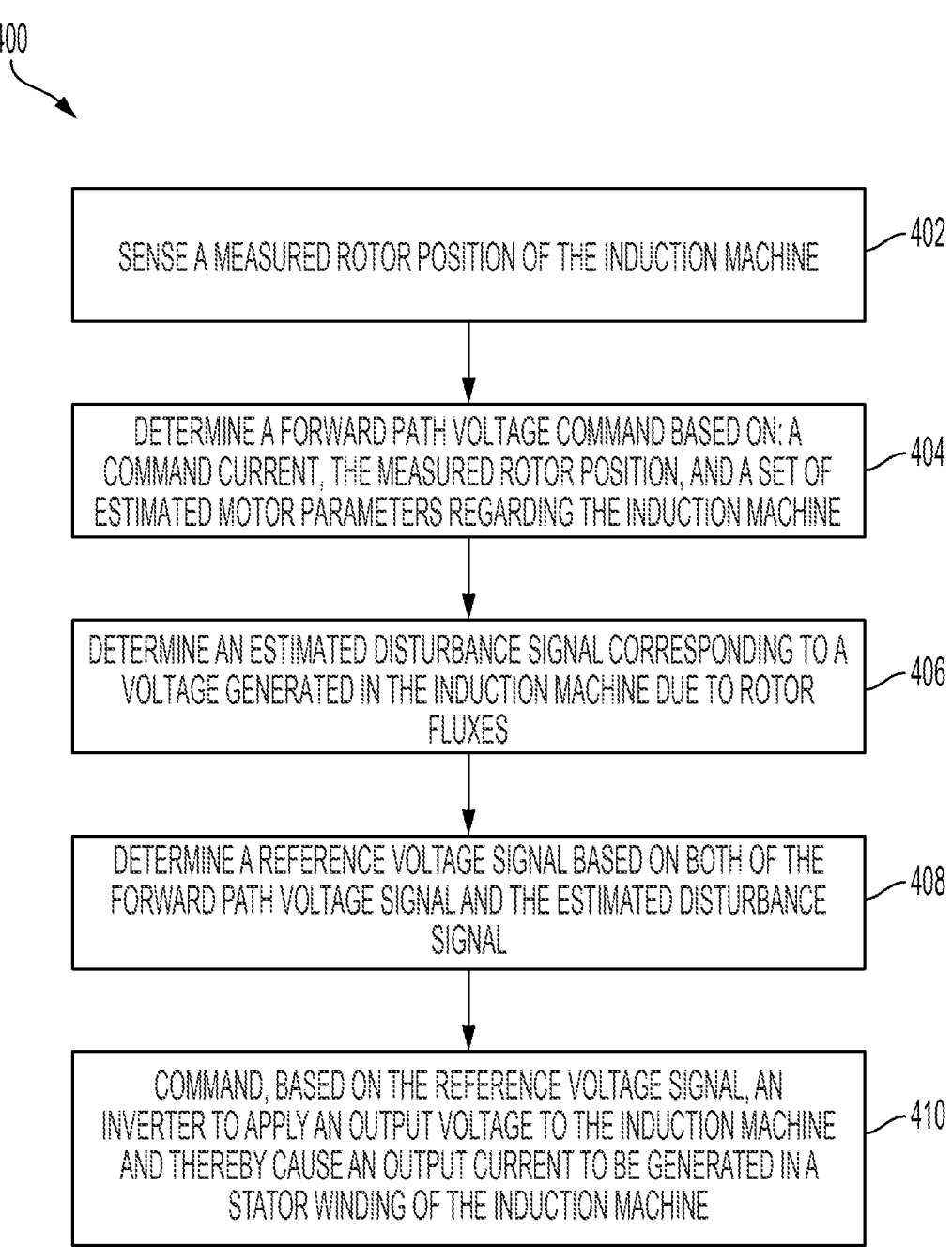

400

SENSE A MEASURED ROTOR POSITION OF THE INDUCTION MACHINE ⸺ 402

DETERMINE A FORWARD PATH VOLTAGE COMMAND BASED ON: A COMMAND CURRENT, THE MEASURED ROTOR POSITION, AND A SET OF ESTIMATED MOTOR PARAMETERS REGARDING THE INDUCTION MACHINE ⸺ 404

DETERMINE AN ESTIMATED DISTURBANCE SIGNAL CORRESPONDING TO A VOLTAGE GENERATED IN THE INDUCTION MACHINE DUE TO ROTOR FLUXES ⸺ 406

DETERMINE A REFERENCE VOLTAGE SIGNAL BASED ON BOTH OF THE FORWARD PATH VOLTAGE SIGNAL AND THE ESTIMATED DISTURBANCE SIGNAL ⸺ 408

COMMAND, BASED ON THE REFERENCE VOLTAGE SIGNAL, AN INVERTER TO APPLY AN OUTPUT VOLTAGE TO THE INDUCTION MACHINE AND THEREBY CAUSE AN OUTPUT CURRENT TO BE GENERATED IN A STATOR WINDING OF THE INDUCTION MACHINE ⸺ 410

FIG. 9

FEEDFORWARD CURRENT CONTROL OF INDUCTION MACHINES

TECHNICAL FIELD

This disclosure relates to electric motor drives and in particular to feedforward current control operation of a motor drive for an induction machine.

BACKGROUND OF THE INVENTION

A vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system and/or other features of the vehicle may include one or more electric motors. Such electric motors may comprise induction machines, which may also be called induction motors.

Although low-weight and high power-density are desirable characteristics for selecting a motor, the increasing cost of rare-earth materials has caused renewed interest in rare-earth free motors such as induction machines (IM) for various industrial applications. Moreover, the power density of IMs has been improved by design optimization. Also, the induction motor offers robust structure, higher maximum speed, and low current at no load and part load operation. Control of IM has always proven to be a challenging problem due to the non-linear relationship of electromagnetic torque with rotor-flux and stator current. Field oriented control (FOC) is a popular and well-established control method for IM. In FOC, motor position dependent quantities in the stationary (or abc) reference frame are transformed to position independent quantities in the synchronous (or dq) reference frame. Control strategies for IMs in the dq reference frame are broadly classified as feedforward current control and feedback current control. A feedforward controller utilizes the knowledge of the motor model and parameter estimation to generate a control voltage command for the motor, whereas the feedback current control uses the measured current to minimize the error between the commanded currents and the measured currents.

Fault tolerant control under the feedback current control systems is enabled by employing the feedforward current control. During the current sensing subsystem failure, the dynamic current control can be achieved by feedforward control. A feedforward current controller utilizes the knowledge of the motor model to generate the voltage commands.

SUMMARY OF THE INVENTION

This disclosure relates generally to control of induction machines, such as induction motors.

An aspect of the disclosed embodiments includes a method for controlling an induction machine. The method includes: determining a forward path voltage command based on: a command current, the measured rotor position, and a set of estimated motor parameters regarding the induction machine; determining an estimated disturbance signal corresponding to a voltage generated in the induction machine due to rotor fluxes; determining a reference voltage signal based on both of the forward path voltage command and the estimated disturbance signal; and commanding, based on the reference voltage signal, an inverter to apply an output voltage to the induction machine and thereby causing an output current to be generated in a stator winding of the induction machine.

Another aspect of the disclosed embodiments includes a system for controlling an induction machine. The system includes a controller. The controller is configured to: determine a forward path voltage command based on: a command current, a measured rotor position, and a set of estimated motor parameters regarding the induction machine; determine an estimated disturbance signal corresponding to a voltage generated in the induction machine due to rotor fluxes; determine a reference voltage signal based on both of the forward path voltage signal and the estimated disturbance signal; and command, based on the reference voltage signal, an inverter to apply an output voltage to the induction machine and thereby causing an output current to be generated in a stator winding of the induction machine.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 9 is a flow diagram generally illustrating a method for controlling an induction machine, according to the principles of the present disclosure.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The present disclosure provides a plant inversion feedforward current control method for induction machines (IM). In the event of current sensor failure, feedforward current control can be employed to perform fault tolerant control of motor drive system. Dynamic current control can still be achieved with feedforward control and can increase the reliability of a drive system.

The feedforward controller of the present disclosure may be used as a backup to a feedback controller that uses a measured current to minimize an error between commanded and measured currents. In some embodiments, the feedforward controller will only replace the feedback controller in case of a faulty current sensor. In some embodiments, one or more healthy phase current sensors can be used to estimate the rotor flux.

Fault tolerant control in a feedback current control system is enabled by employing the feedforward current control. In case of a failure in current sensing, dynamic current control can be achieved by feedforward control. A feedforward current controller may utilize knowledge of a motor model to generate voltage commands. The bandwidth and performance may depend on the implementation of dynamical terms involved in the motor model and accurate estimation of motor parameters. Implementing feedforward control in faster rate with derivative filter may provide higher bandwidth. The present disclosure provides a feedforward current control for IM, which incorporates the rotor flux linkage dynamics and slip speed dynamics.

Figure 1:
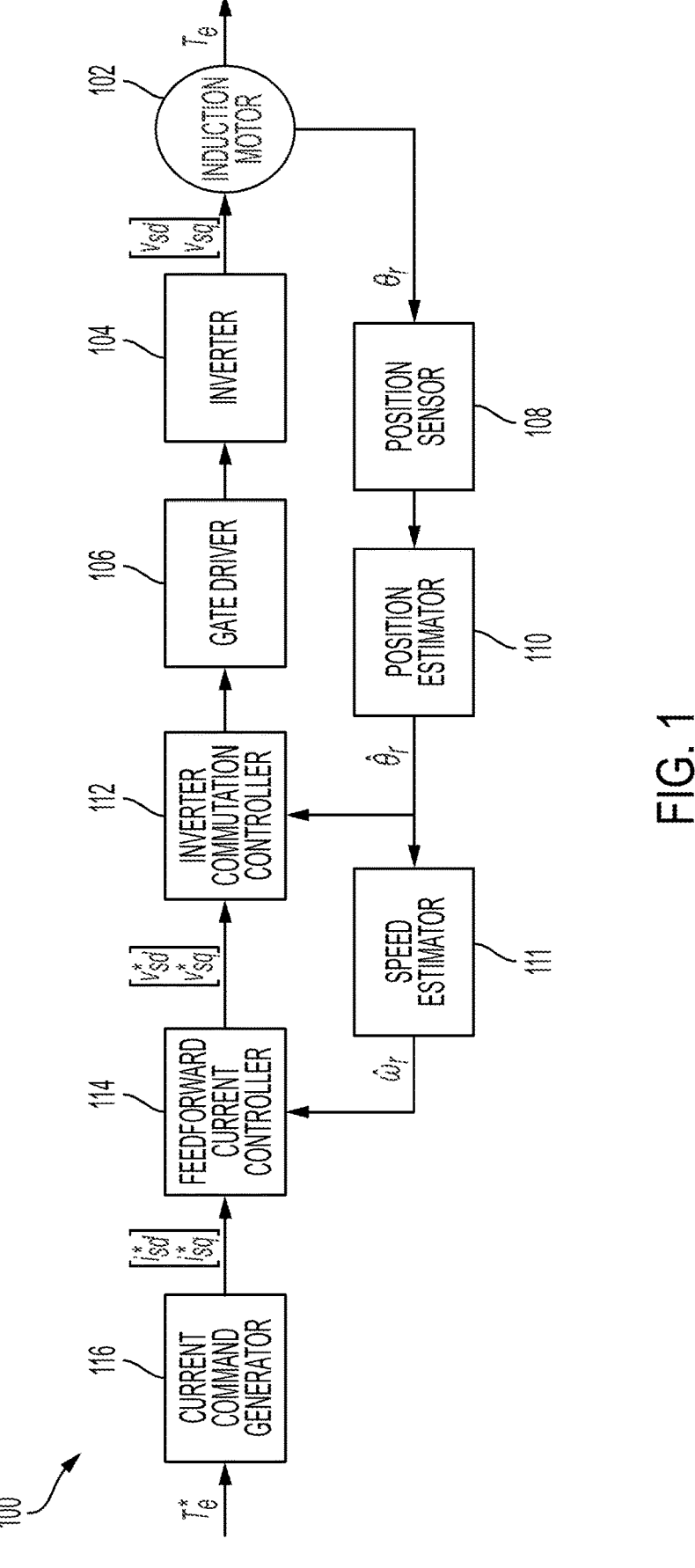
FIG. 1 shows a block diagram of the torque and current control of an induction motor drive.

FIG. 1 generally illustrates a motor control system 100 with feedback current control, according to principles of the present disclosure. The system 100 may include a current command generator 116, a feedforward current controller 114, a commutation controller 112, a gate driver 106, an inverter 104, an IM 102, a position sensor 108, a position estimator 110, and a speed estimator 111. It should be noted that fewer or more components may be included in the system 100 as desired to perform the techniques disclosed herein and the components depicted are for explanatory purposes.

In some embodiments, the synchronous motor drive system 100 may function as follows. The feedforward current controller 114 receives a command or reference current and outputs a corresponding output voltage command signal. The position sensor 108 may be configured to sense a position of the IM 102. The position sensor 108 may communicate the sensed position to the position estimator 110. The position estimator 110 may estimate one or more positions of the IM 102 based on the position sensed by the position sensor 108.

With the foregoing described, additional details and operation of the system 100 will now be discussed. The IM 102 may generate rotational or linear force used to power a machine, such as those described herein. The IM 102 may include a synchronous motor, such as a PMSM or other suitable motor. The system 100 may selectively control electrical energy provided to the IM 102. The system 100 may provide the electrical energy to the IM 102 in varying amounts and at varying frequencies, thereby indirectly controlling the speed and torque of the IM 102.

The current command generator 116 may receive a torque command $T_e^*$. The current command generator 112 may generate a commanded current $I^*_{dq}$ based on the torque command $T_e^*$. The current command $I^*$ may be composed of a direct axis (direct-axis) $I^*_d$ and a quadrature axis (quadrature-axis) $I^*_q$ current component. The feedforward current controller 114 receives the commanded current and transmits an output voltage command signal $V^*_{dq}$ to the commutation controller 106. The voltage command $V^*$ may be composed of a direct-axis component $V^*_d$ and a quadrature-axis component $V^*_q$. The commutation controller 106 may control a proportion of time the output voltage signal is high compared to when it is low over a consistent period of time, which may control a direction and speed of the IM 102. The gate driver 107 receives one or more signals from the commutation controller 106, and uses those one or more signals to control a conductive state of one or more switches within the inverter 104. The inverter 104 may include a voltage source inverter or other suitable inverter and may be configured to vary the frequency of the supply electrical energy provided to the IM 102 to control the speed of the IM 102. The IM 102 may receive an output voltage signal $V_{abc}$ as an input (e.g., which may include $V_a$, $V_b$, and $V_c$). The IM 102 may use the input to generate an amount of current $I_{abc}$ as output (e.g., which may include $I_a$, $I_b$, and $I_c$) that may be equal to the commanded current or vary from the commanded current (e.g., when there is a current harmonic).

The feedforward current controller 114 may receive the estimated current and compare it to the commanded current $I^*_{dq}$. If there is any variation, the feedforward current controller 114 may transmit an output voltage command signal $V^*_{dq}$ that will cause the estimated current $\hat{I}_{dq}$ to closely match the commanded current $I^*_{dq}$. As such, since the commanded current $I_{dq}$ is constant (or varying slowly) and the estimated current $\hat{I}_{dq}$ equals the commanded current $I^*_{dq}$, then the estimated current $I^*_{dq}$ is also constant. When current harmonic exists in the current measurement system, the feedforward current controller 114 may include a pulsating component in the output voltage command signal $V^*_{dq}$.

Stator currents in an IM generate a rotating magnetic field which induces a voltage in rotor conductors. This induced voltage causes a rotor current which in turn creates a magnetic field. The interaction between these two magnetic fields generates torque and subsequently the rotor (or motor) speed, depending on the mechanical dynamics of the system. The stator and rotor voltages, currents, fluxes are position dependent quantities in the stationary (or abc) reference frame, but these terms are position independent quantities in the synchronous (or dq) reference frame. The IM may be modeled in the synchronous reference frame oriented to the rotor position as set forth in equations (1)-(5):

$$\frac{di_{sd}}{dt} = -\frac{1}{\tau_\sigma}i_{sd} + \omega_s i_{sq} + \frac{k_r}{r_\sigma \tau_\sigma \tau_r}\psi_{rd} + \frac{1}{r_\sigma \tau_\sigma}v_{sd} \tag{1}$$

$$\frac{di_{sq}}{dt} = -\omega_s i_{sd} - \frac{1}{\tau_\sigma}i_{sq} - \frac{k_r}{r_\sigma \tau_\sigma}\omega_r \psi_{rd} + \frac{1}{r_\sigma \tau_\sigma}v_{sq} \tag{2}$$

$$\frac{d\psi_{rd}}{dt} = \frac{L_m}{\tau_r}i_{sd} - \frac{1}{\tau_r}\psi_{rd} \tag{3}$$

$$\frac{d\psi_{rq}}{dt} = \frac{L_m}{\tau_r}i_{sq} - (\omega_s - \omega_r)\psi_{rd} \tag{4}$$

$$T_e = \frac{3}{2}\frac{P}{2}\frac{L_m}{L_r}\psi_{rd}i_{sq} \tag{5}$$

where equation (1) is a stator d-axis current equation, equation (2) is a stator q-axis current equation, equation (3) is a rotor flux d-axis equation, equation (4) is a rotor flux q-axis equation, and equation (5) is a torque equation; and where $i_{sd}$, and $i_{sq}$ are d-axis and q-axis stator currents, respectively; $v_{sd}$, and $v_{sq}$ are d-axis and q-axis stator voltages, respectively; $\omega_{rd}$ and $\psi_{rq}$ are the d-axis and q-axis rotor fluxes, respectively; $\omega_s$ is synchronous speed of the IM, which may also be called stator electrical frequency; $\omega_r$ is rotor speed of the $L_m$, $L_s$, and $L_r$ are magnetizing, stator, and rotor inductances, respectively; $r_s$ is stator resistance, $r_r$ is rotor resistance. Note that the q-axis rotor flux $\psi_{rq}$ is zero due to the specific orientation of the aforementioned synchronous reference frame. Additionally, $\tau_r$ is a rotor time constant, which may be determined as set forth in equation (6), $k_r$ is a coupling coefficient, which may be determined as set forth in equation (7), $r_\sigma$ is an equivalent resistance of the IM, which may be determined as set forth in equation (8), $\sigma$ is a leakage coefficient, which may be determined as set forth in equation (9), and $\tau_\sigma$ is a combined time constant of the induction machine, which may be determined as set forth in equation (10):

$$\tau_r = \frac{L_r}{r_r} \tag{6}$$

$$k_r = \frac{L_m}{L_r} \tag{7}$$

$$r_\sigma = r_s + r_r k_r^2 \tag{8}$$

$$\sigma = 1 - \frac{L_m^2}{L_s L_r} \tag{9}$$

$$\tau_\sigma = \frac{\sigma L_s}{r_\sigma} \tag{10}$$

The motor parameters may vary during the operation of the IM 102. The stator and rotor resistances, $r_s$, and $r_r$, may vary with temperature and motor build. The inductances are a function of magnetic saturation and thus vary with stator currents. Although the rotor speed can be measured or estimated, slip speed estimation is necessary to determine a synchronous speed estimation.

The d-axis rotor flux dynamics are controlled by the d-axis current. However, the dynamics of d-axis rotor flux is relatively slow compared to the dynamics of d-axis current due to the influence of magnetizing inductance. Also, the q-axis rotor flux is zero as rotor-flux orientation is along the d-axis. The electromagnetic torque is dependent on the d-axis rotor flux magnitude and the q-axis current.

It can be observed that the d-axis and q-axis stator equations are non-linear. This non-linearity is introduced by the rotor-flux and rotor speed along with variation of the motor parameters.

The d— and q-axis voltage equations can be written, as set forth in equation (11):

$$\begin{bmatrix} v_{sd} \\ v_{sq} \end{bmatrix} = \begin{bmatrix} \sigma L_s s + r_\sigma & -\omega_s \sigma L_s \\ \omega_s \sigma L_s & \sigma L_s s + r_\sigma \end{bmatrix} \begin{bmatrix} i_{sd} \\ i_{sq} \end{bmatrix} + \begin{bmatrix} -\dfrac{k_r}{\tau_r}\psi_{rd} \\ \omega_r k_r \psi_{rd} \end{bmatrix} \tag{11}$$

where the second term $$\begin{bmatrix} -\dfrac{k_r}{\tau_r}\psi_{rd} \\ \omega_r k_r \psi_{rd} \end{bmatrix},$$

is the disturbance term in the model.

Figure 3:
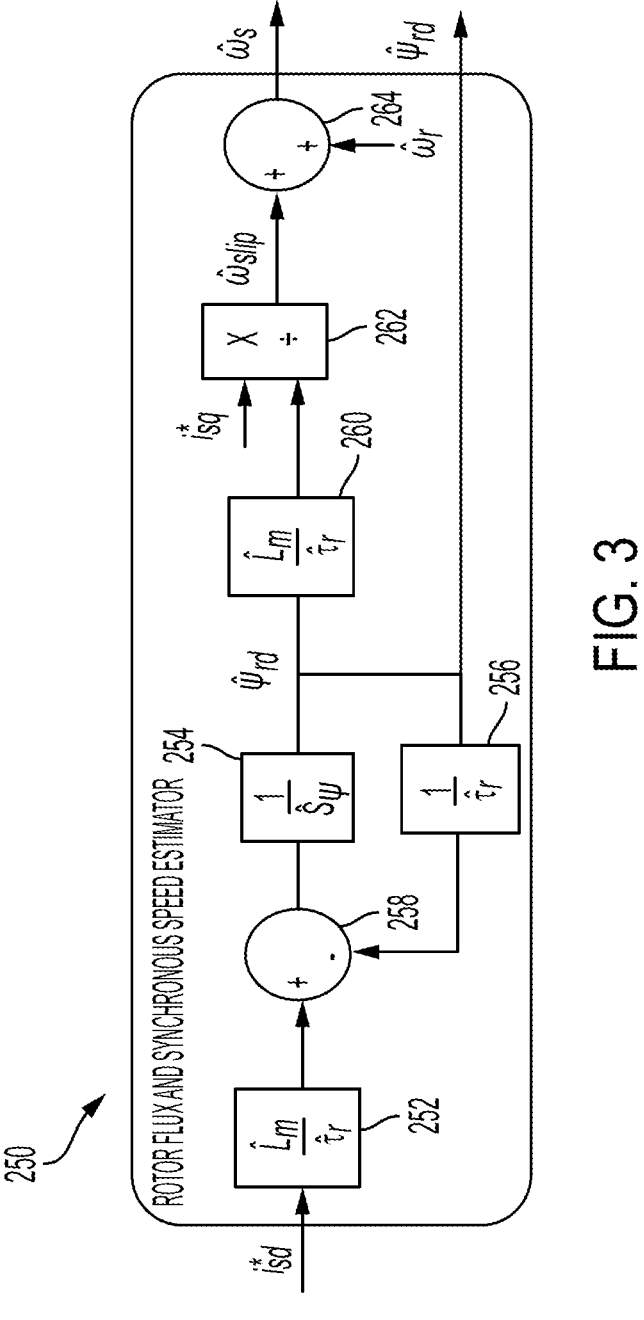
FIG. 3 shows a block diagram representation of rotor flux and synchronous speed estimator for an induction motor, according to aspects of the present disclosure.
Figure 4:
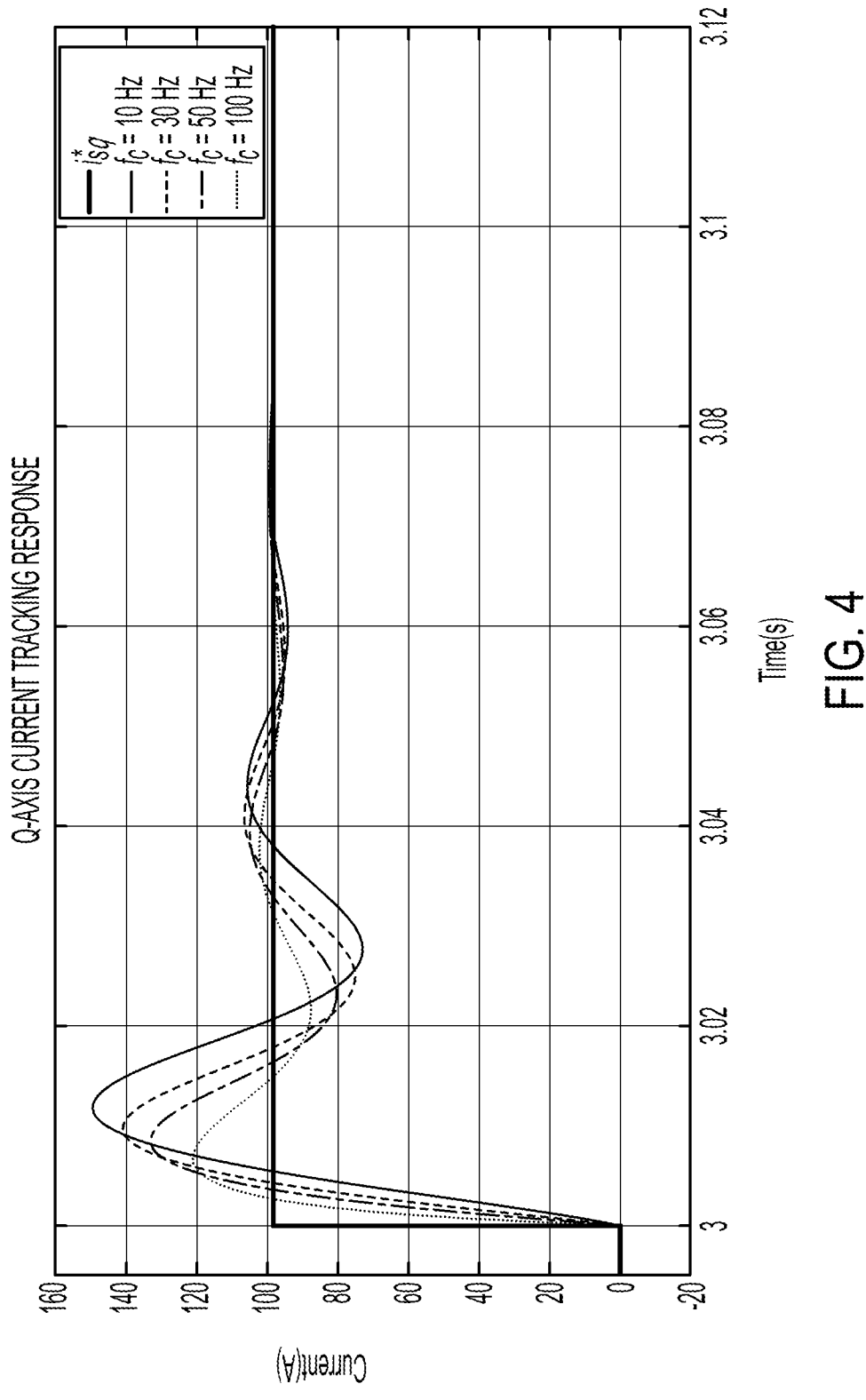
FIG. 4 shows a graph that illustrates effects of different low-pass filter cutoff frequencies on the q-axis current tracking response performance, according to aspects of the present disclosure

Feedforward control estimates the control voltage command for the plant based on the knowledge of the plant and motor parameter estimation. The motor model especially requires d-axis rotor flux and synchronous speed. A feedforward controller is shown in FIG. 3. A rotor flux and synchronous speed estimator is illustrated in FIG. 4. These are described in detail, below.

The dynamic feedforward controller for IM current control can be written as set forth in equation (12):

$$\begin{bmatrix} v_{sd}^* \\ v_{sq}^* \end{bmatrix} = \begin{bmatrix} \hat{\sigma}\hat{L}_s\hat{s} + \hat{r}_\sigma & -\hat{\omega}_s\hat{\sigma}\hat{L}_s \\ \hat{\omega}_s\hat{\sigma}\hat{L}_s & \hat{\sigma}\hat{L}_s\hat{s} + \hat{r}_\sigma \end{bmatrix} \begin{bmatrix} i_{sd}^* \\ i_{sq}^* \end{bmatrix} + \begin{bmatrix} -\dfrac{\hat{k}_r}{\hat{\tau}_r}\hat{\psi}_{rd} \\ \hat{\omega}_r\hat{k}_r\hat{\psi}_{rd} \end{bmatrix} \tag{12}$$

where ^ (hat), and * (asterisk) are used to indicate estimated parameters and commands, respectively.

To achieve current control in the synchronous reference frame, estimation of synchronous speed $\omega_s$ may be required. Thus, slip speed estimation may be an important consideration for feedforward current control of IM, since the synchronous speed is the sum of the rotor velocity and the slip speed. The estimated slip speed is based on an estimate of rotor flux. Additionally, the rotor flux estimate is required for disturbance compensation.

Figure 2:
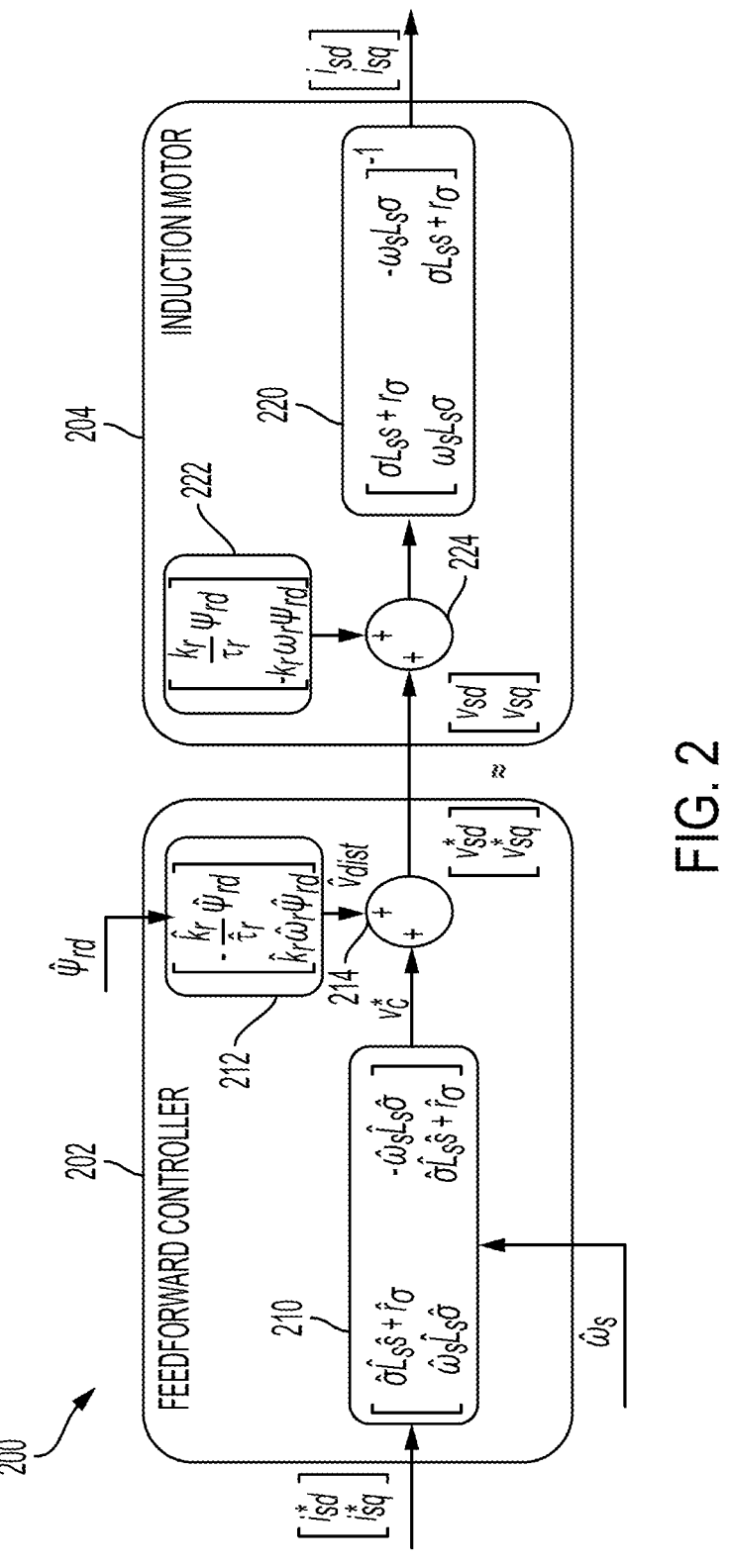
FIG. 2 shows a system block diagram representation of feedforward current control of an induction motor, according to aspects of the present disclosure.

FIG. 2 shows a block diagram of a mathematical model for a feedforward current control system 200. The feedforward current control system 200 includes a feedforward controller 202 that is configured to determine a reference voltage signal $$\begin{bmatrix} v_{sd}^* \\ v_{sq}^* \end{bmatrix}$$

based on the command current $$\begin{bmatrix} i_{sd}^* \\ i_{sq}^* \end{bmatrix}.$$

The feedforward current control system 200 also includes a plant model 204 that represents the dynamic behavior of the IM 102 by determining the actual current signal $$\begin{bmatrix} i_{sd} \\ i_{sq} \end{bmatrix}$$

based on an applied voltage signal $$\begin{bmatrix} v_{sd} \\ v_{sq} \end{bmatrix}.$$

The applied voltage $$\begin{bmatrix} v_{sd} \\ v_{sq} \end{bmatrix}$$

signal may be assumed to be approximately equal to the reference voltage signal $$\begin{bmatrix} v_{sd}^* \\ v_{sq}^* \end{bmatrix}$$

if the dynamics of the gate driver and inverter are considered to be ideal.

The feedforward controller 202 includes a forward path controller 210 that determines a forward path voltage command signal $v_c^*$ based on the command current $$\begin{bmatrix} i_{sd}^* \\ i_{sq}^* \end{bmatrix}.$$

The forward path controller 210 may implement a forward path transfer function $$\begin{bmatrix} \hat{\sigma}\hat{L}_s \hat{s} + \hat{r}_\sigma & -\hat{\omega}_s \hat{\sigma}\hat{L}_s \\ \hat{\omega}_s \hat{\sigma}\hat{L}_s & \hat{\sigma}\hat{L}_s \hat{s} + \hat{r}_\sigma \end{bmatrix}$$

to generate the forward path voltage command signal $v_c^*$ based on the command current $$\begin{bmatrix} i_{sd}^* \\ i_{sq}^* \end{bmatrix}.$$

The forward path controller 210 takes, as an input, an estimated synchronous speed $\hat{\omega}_s$ of the IM. The estimated synchronous speed $\hat{\omega}_s$ of the IM may be determined as shown and described with reference to FIG. 4 of the present disclosure.

The feedforward current control system 200 also includes a disturbance estimator 212 that determines an estimated disturbance signal $\hat{v}_{dist}$ corresponding to a voltage generated in the induction machine due to rotor fluxes. The disturbance estimator 212 may determine the estimated disturbance signal $\hat{v}_{dist}$ based on an estimated d-axis rotor flux $\hat{\psi}_{rd}$ of the IM 102. The estimated disturbance signal $\hat{v}_{dist}$ compensates for the disturbance term of the IM 102. As shown in FIG. 2, the disturbance estimator 212 determines the estimated disturbance signal $\hat{v}_{dist}$ as:

$$\begin{bmatrix} v_{sd}^* \\ v_{sq}^* \end{bmatrix}.$$

The feedforward current control system 200 also includes a first adder 214 that adds the forward path voltage command signal $v_c^*$ to the estimated disturbance signal $\hat{v}_{dist}$ to determine the reference voltage signal $$\begin{bmatrix} v_{sd}^* \\ v_{sq}^* \end{bmatrix}.$$

The reference voltage signal $$\begin{bmatrix} v_{sd}^* \\ v_{sq}^* \end{bmatrix}$$

may be used as a command setting for an AC voltage to be generated by the inverter 104 via the gate driver 106 for application to the IM 102.

The induction motor 204 includes a disturbance 222 that represents voltages generated in the IM 102 due to rotor fluxes. The resultant of the applied voltage signal $$\begin{bmatrix} v_{sd} \\ v_{sq} \end{bmatrix}$$

and the disturbance term at 224 then causes the generation of the actual current signal $$\begin{bmatrix} i_{sd} \\ i_{sd} \end{bmatrix}$$

based on the IM electrical dynamics 220.

FIG. 3 shows a block diagram representation of a rotor flux and synchronous speed estimator 250 for determining an estimated rotor flux $\hat{\psi}_{rd}$, an estimated slip speed $\hat{\omega}_{slip}$, and an estimated synchronous speed $\hat{\omega}_s$ of an IM, based on the command current $$\begin{bmatrix} i_{sd}^* \\ i_{sq}^* \end{bmatrix}.$$

The specific implementation of the rotor flux and synchronous speed estimator 250 is determined based on the model of IM described previously.

In some embodiments, the estimated d-axis rotor flux $\hat{\psi}_{rd}$ may be determined using equation (13):

$$\hat{\psi}_{rd} = \frac{\hat{L}_m}{1 + \hat{\tau}_r \hat{s}_\psi} i_{sd}^* \tag{13}$$

where $\hat{s}_\psi$ is an approximate discrete implementation of the derivative operator.

In some embodiments, the estimated slip speed $\hat{\omega}_{slip}$ may be determined using equation (14):

$$\hat{\omega}_{slip} = \frac{\hat{L}_m}{\hat{\tau}_r} \frac{i_{sq}^*}{\hat{\psi}_{rd}} \tag{14}$$

In some embodiments, the estimated synchronous speed $\hat{\omega}_s$ may be determined using equation (15):

$$\hat{\omega}_s = \hat{\omega}_{slip} + \hat{\omega}_r \tag{15}$$

The rotor flux and synchronous speed estimator 250 includes a first divider 252 that divides a product of a d-axis component $i_{sd}^*$ of the command current $$\begin{bmatrix} i_{sd}^* \\ i_{sq}^* \end{bmatrix}.$$

which may also be called a d-axis current command, times an estimated mutual inductance $\hat{L}_m$ of the IM by an estimated rotor time constant $\hat{\tau}_r$ of the IM.

The rotor flux and synchronous speed estimator 250 also includes a discrete time integrator 254 configured to calculate the estimated rotor flux $\hat{\psi}_{rd}$ based on the quotient of: the d-axis current command $i^*_{sd}$ times the estimated mutual inductance $\hat{L}_m$ divided by the estimated rotor time constant $\hat{\tau}_r$.

The rotor flux and synchronous speed estimator 250 includes a second divider 256 that divides the estimated rotor flux $\hat{\psi}_{rd}$ by the estimated rotor time constant $\hat{\tau}_r$ of the IM. The controller also includes a subtractor 258 that subtracts the quotient of the estimated rotor flux $\hat{\psi}_{rd}$ divided by the estimated rotor time constant $\hat{\tau}_r$, as determined by the second divider 256, from the quotient of the estimated mutual inductance $\hat{L}_m$ divided by the estimated rotor time constant $\tau \hat{\tau}_r$, as determined by the first divider. The discrete time integrator 254 takes, as an input, a difference signal from the subtractor 258 representing the difference between the quotient of the estimated rotor flux $\hat{\psi}_{rd}$ divided by the estimated rotor time constant $\hat{\tau}_r$ minus the quotient of the estimated rotor flux $\hat{\psi}_{rd}$ divided by the estimated rotor time constant $\hat{\tau}_r$.

The rotor flux and synchronous speed estimator 250 also includes a third divider 260 that divides the estimated mutual inductance $\hat{L}_m$ by the estimated rotor time constant $\hat{\tau}_r$ of the IM to determine a quotient of those terms, and which multiplies the quotient of the estimated mutual inductance $\hat{L}_m$ and the estimated rotor time constant $\hat{\tau}_r$ by the q-axis component $i^*_{sq}$ of the command current $$\begin{bmatrix} i^*_{sd} \\ i^*_{sq} \end{bmatrix},$$

which may also be called a q-axis current command.

The rotor flux and synchronous speed estimator 250 also includes a fourth divider 262 that calculates the estimated slip speed $\hat{\omega}_{slip}$ of the IM by dividing the output of the third divider 260 by the estimated rotor flux $\hat{\psi}_{rd}$.

The rotor flux and synchronous speed estimator 250 also includes an adder 264 that determines the estimated synchronous speed $\hat{\omega}_s$ of the IM as a sum of the estimated slip speed $\hat{\omega}_{slip}$ and an estimated rotor speed $\hat{\omega}_r$ of the IM. The estimated rotor speed $\hat{\omega}_r$ may be determined by the position sensor 108 or communicated from another source, such as a machine driven by the IM 102.

In some embodiments, the estimated d-axis rotor flux $\hat{\psi}_{rd}$ and the estimated slip speed $\hat{\omega}_{slip}$ may be used, along with d—and q-axis current command $$\begin{bmatrix} i^*_{sd} \\ i^*_{sq} \end{bmatrix}$$

on the inverse plant model to generate the d—and q-axis voltage command $$\begin{bmatrix} v^*_{sd} \\ v^*_{sq} \end{bmatrix}$$

for the plant as set forth in equation (16):

$$\begin{bmatrix} v^*_{sd} \\ v^*_{sq} \end{bmatrix} = \begin{bmatrix} \hat{\sigma}\hat{L}_s\hat{s} + \hat{r}_\sigma & -(\omega_r + \hat{\omega}_{slip})\hat{\sigma}\hat{L}_s \\ (\omega_r + \hat{\omega}_{slip})\hat{\sigma}\hat{L}_s & \hat{\sigma}\hat{L}_s\hat{s} + \hat{r}_\sigma \end{bmatrix} \begin{bmatrix} i^*_{sd} \\ i^*_{sq} \end{bmatrix} + \begin{bmatrix} \frac{\hat{k}_r}{\hat{\tau}_r}\hat{\psi}_{rd} \\ -\hat{\omega}_r\hat{k}_r\hat{\psi}_{rd} \end{bmatrix} \quad (16)$$

In some embodiments, the s term in the inverse plant model is discretized with a discretization technique along with the low pass filter implementation. Various different discretization techniques may be used, and the discretization technique used may depend on the sample rate of the control system. A cutoff frequency of the low-pass filter impacts the dynamics performance of the controller. FIG. 4 shows the effects of $\hat{s}$. More specifically, FIG. 4 shows a graph that illustrates effects of different low-pass filter frequencies on the dynamic current response performance. As shown, increases in the frequency of the low pass filter correspond to decreases in the q-axis current overshoot of the system.

Figure 5:
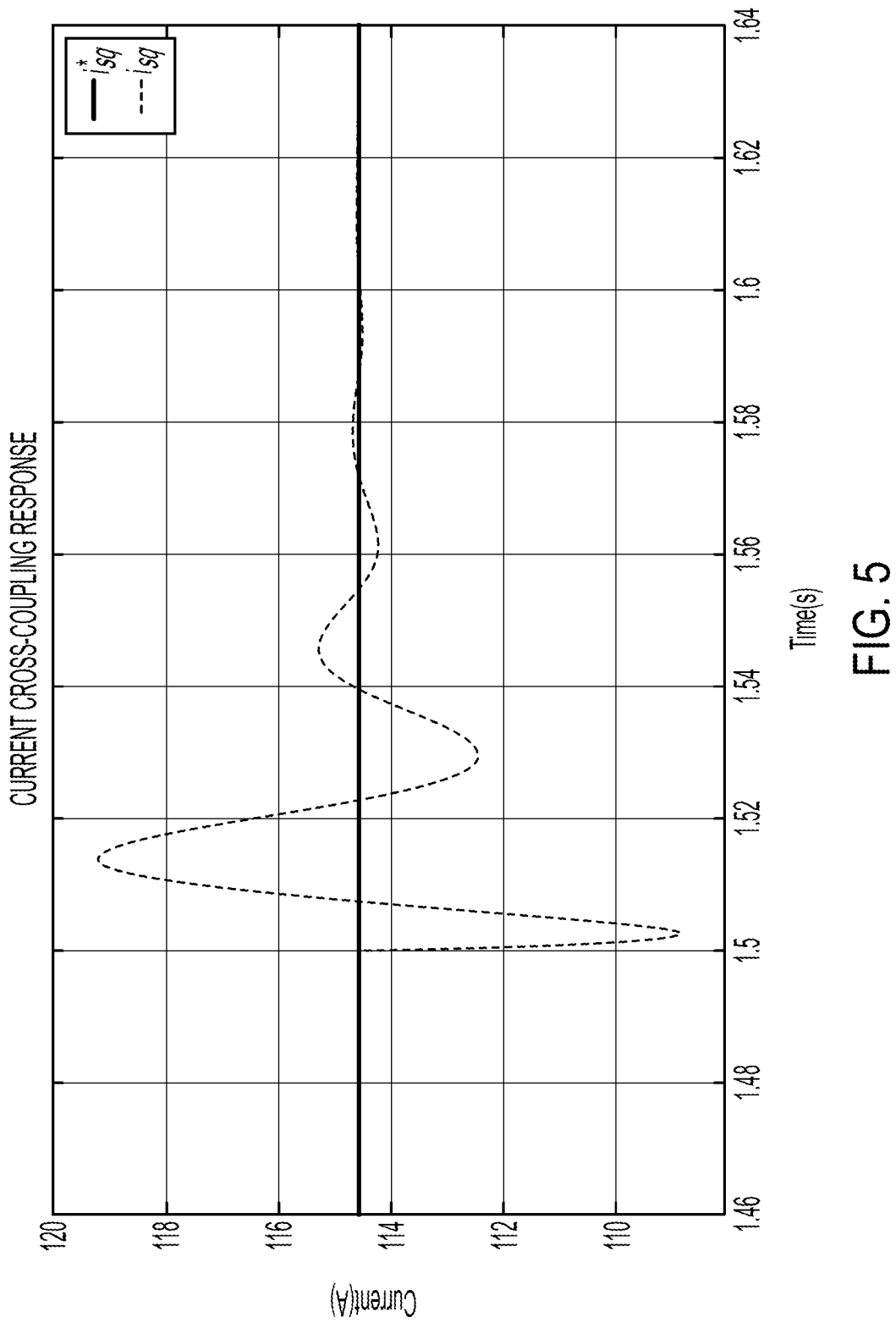
FIG. 5 shows a graph that illustrates effects of d-axis current command reference on the q-axis current output, according to aspects of the present disclosure

FIG. 5 shows a graph that illustrates effects of d-axis rotor flux linkage reference on a change in q-axis current command. The d-axis rotor flux $\psi_{rd}$ may be translated to q-axis current command change as set forth in equation (17):

$$i_{sq} = \frac{\tau_r \omega_{slip}}{L_m} \psi_{rd} \quad (17)$$

When d-axis current is changed from 98A to 114A, as shown at time=1.5 s, and with a steady q-axis command current $i^*_{sq}$ the actual q-axis current $i_{sq}$ varies due to a step change in reference rotor flux. This effect may also be called current cross-coupling response. As shown, the measured q-axis current $i_{sq}$ traces the q-axis command current $i^*_{sq}$ without any steady state error within about 0.1 sec.

Figure 6:
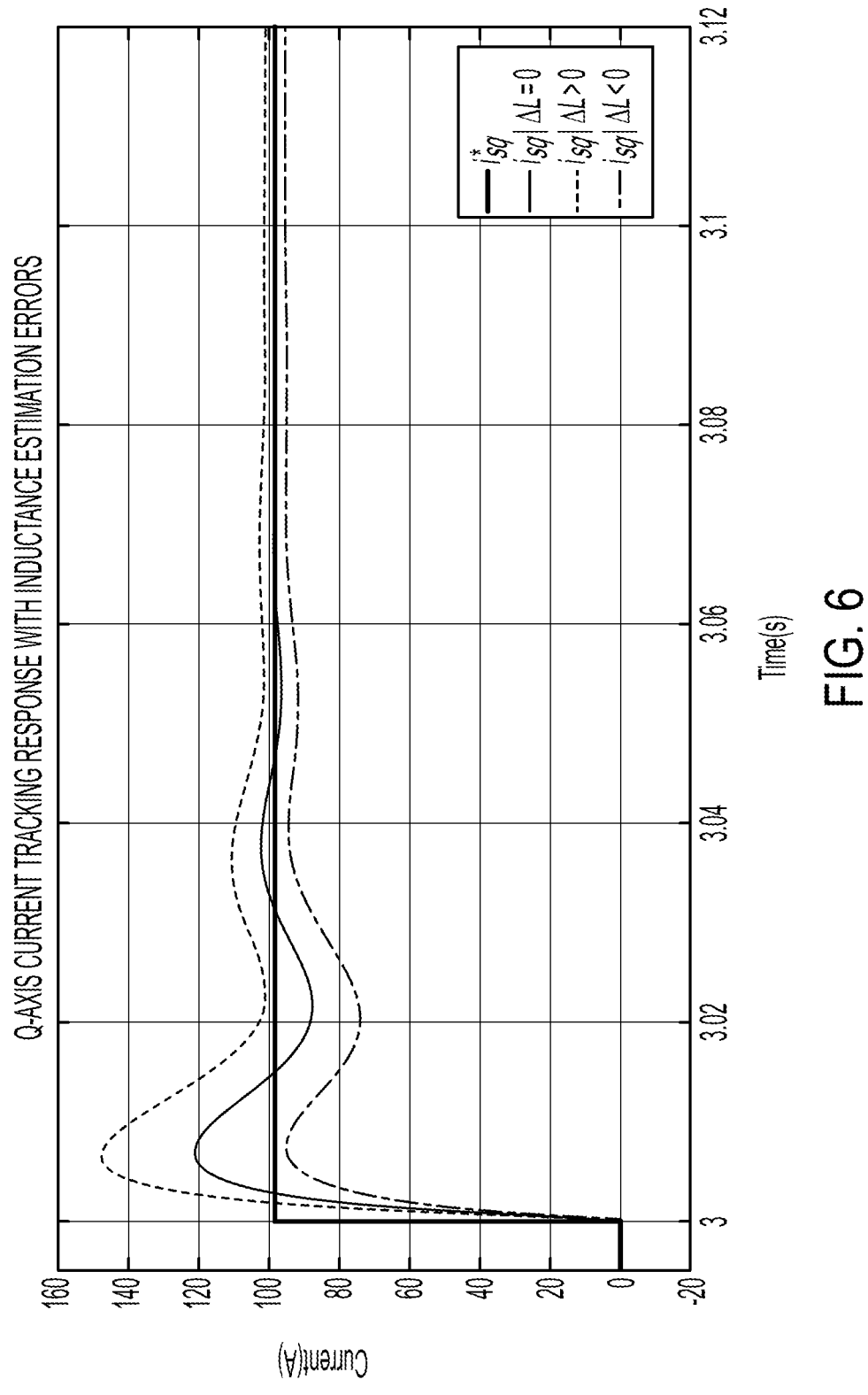
FIG. 6 shows a graph that illustrates effects of inductance estimate errors on the q-axis current tracking response, according to aspects of the present disclosure.
Figure 7:
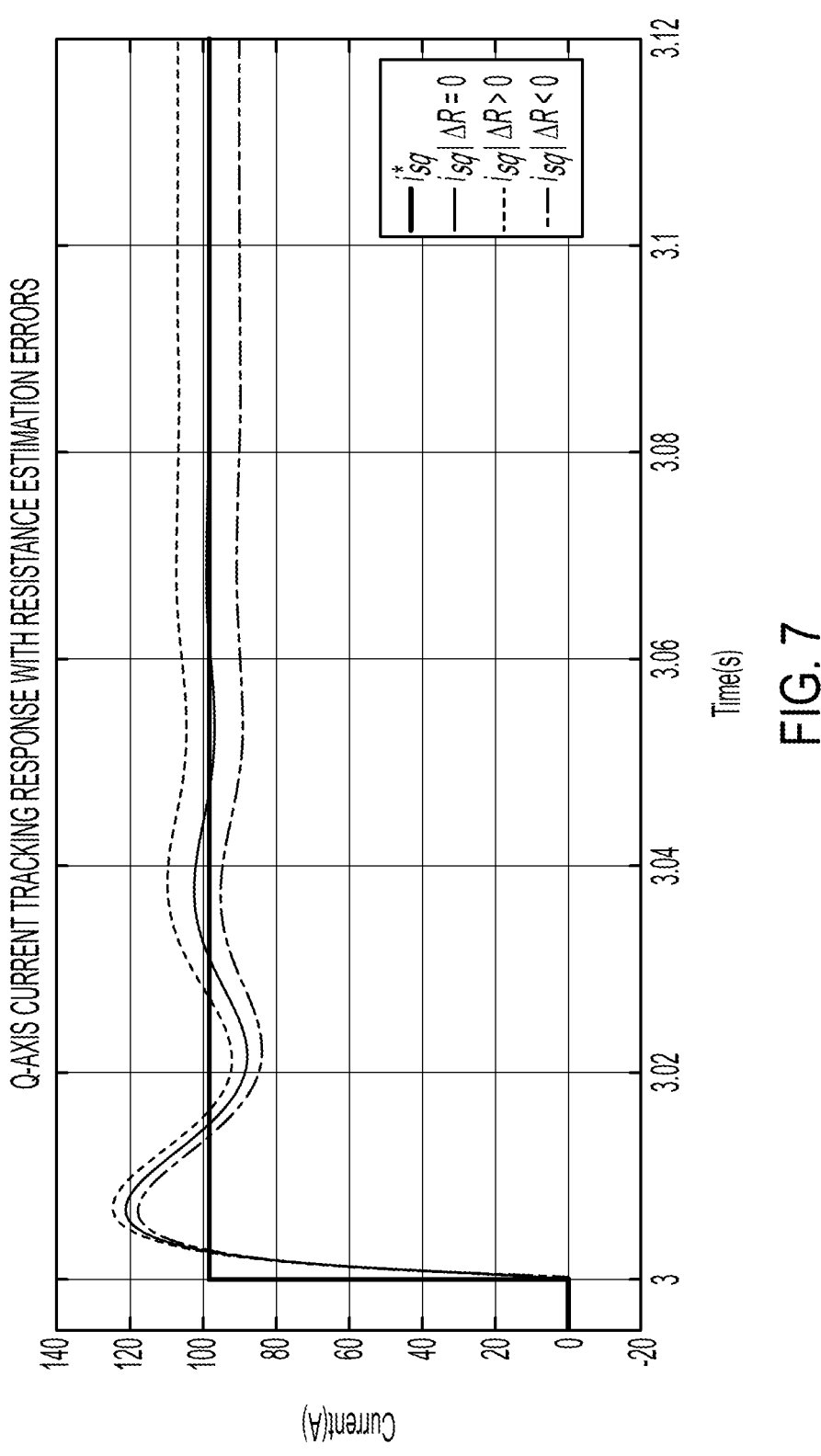
FIG. 7 shows a graph that illustrates effects of resistance estimate errors on the q-axis current tracking response, according to aspects of the present disclosure.

FIG. 6 shows a graph that illustrates effects of inductance estimate errors, according to aspects of the present disclosure. FIG. 7 shows a graph that illustrates effects of resistance estimate errors, according to aspects of the present disclosure. In FIGS. 6-7, effects of inductance and resistance on the q-axis current are shown. Inductance is increased and decreased by 2% but resistances are changed by 10%. Each of these parameter changes cause steady state errors.

Figure 8:
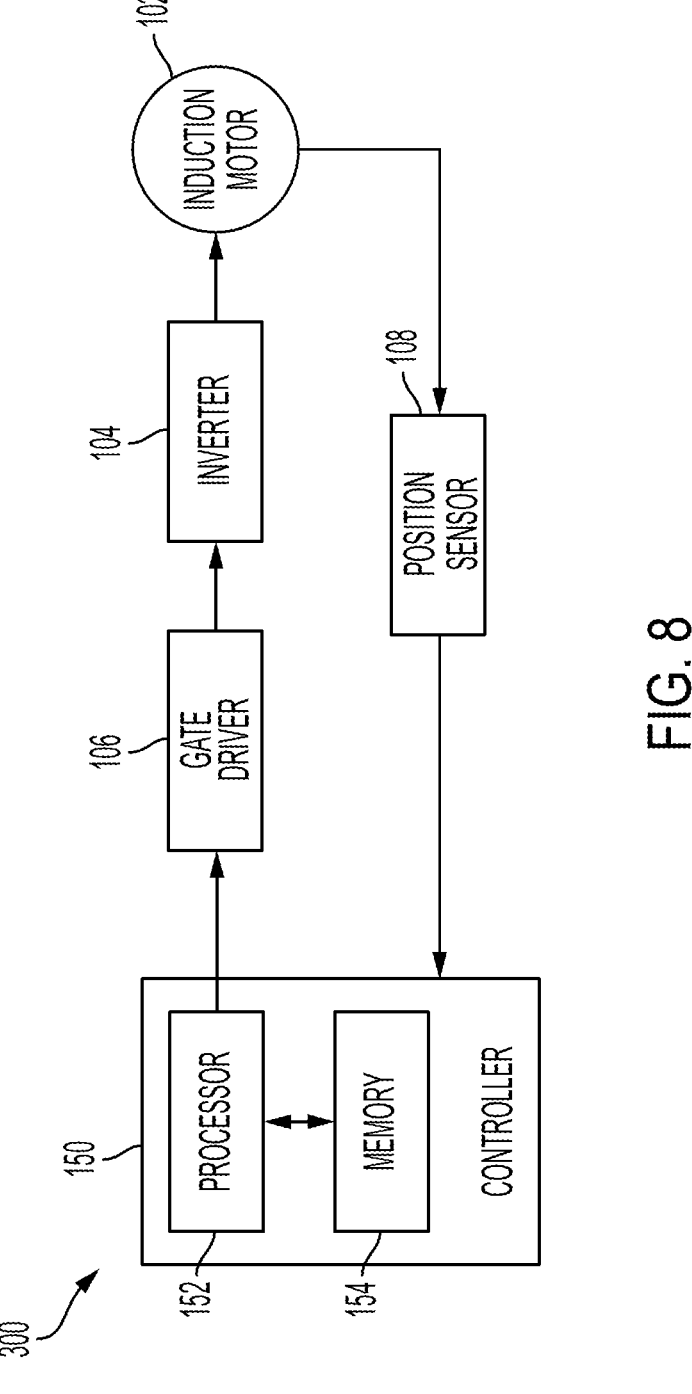
FIG. 8 shows a block diagram showing hardware components of a motor control system, according to aspects of the present disclosure.

FIG. 8 shows a block diagram showing a motor control system 300 that includes an IM 102 that is connected to an inverter 104, which is driven by a gate driver 106. The inverter 104 is configured to generate and apply an alternating current (AC) power to the IM 102. The motor control system 100 also includes a position sensor 108 that measures a rotational position of the IM 102.

The motor control system 300 also includes a controller 150. The controller 150 may include any suitable controller, such as an electronic control unit or other suitable controller. The controller 150 may be configured to control, for example, the various functions of the steering system and/or various functions of the vehicle 10. The controller 150 may include a processor 152 and a memory 154. The processor 152 may include any suitable processor, such as those described herein. Additionally, or alternatively, the controller 150 may include any suitable number of processors, in addition to or other than the processor 152. The memory 154 may comprise a single disk or a plurality of disks (e.g., hard drives), and includes a storage management module that manages one or more partitions within the memory 154. In some embodiments, memory 154 may include flash memory, semiconductor (solid state) memory or the like. The memory 154 may include Random Access Memory (RAM), a Read-Only Memory (ROM), or a combination thereof. The memory 154 may include instructions that, when executed by the processor 152, cause the processor 152 to, at least, control various aspects of the vehicle 10. Additionally, or alternatively, the memory 154 may include instructions that, when executed by the processor 152, cause the processor 152 to perform functions associated with the systems and methods described herein.

As shown, the controller 150 is operably connected to the gate driver 106 which drives the inverter 104 and is configured to send one or more commands via the gate driver 106 to cause the inverter 104 to apply the AC power to the IM 102. The controller 150 may receive one or more signals from the position sensor 108, the inverter 104 and/or one or more other sensors. The sensors may include any suitable sensors, measurement devices, and/or other suitable mechanisms. For example, the sensors may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angle, a motor velocity, a vehicle speed, other suitable information, or a combination thereof.

In some embodiments, the controller 150 may perform the methods described herein. However, the methods described herein as performed by the controller 150 are not meant to be limiting, and any type of software executed on a controller or processor can perform the methods described herein without departing from the scope of this disclosure. For example, a controller, such as a processor executing software within a computing device, can perform the methods described herein.

FIG. 9 is a flow diagram generally illustrating a method 400 for controlling an IM, according to the principles of the present disclosure.

At 402, the method 400 senses a measured rotor position of the IM. For example, the position sensor 108 may sense the rotor position of the IM 102, and the processor 152 may execute instructions to read the measured rotor position from the position sensor 108.

At 404, the method 400 determines a forward path voltage command based on: a command current, the measured rotor position, and a set of estimated motor parameters regarding the induction machine. For example, the processor 152 may execute instructions to implement the forward path controller 210 of the feedforward controller 202 to calculate the forward path voltage command signal v*_c based on the command current $$\begin{bmatrix} i_{sd}^* \\ i_{sq}^* \end{bmatrix}.$$

At 406, the method 400 determines an estimated disturbance signal corresponding to a voltage generated in the induction machine due to rotor fluxes. For example, the processor 152 may execute instructions to implement the disturbance estimator 212 to determine the estimated disturbance signal $\hat{v}_{dist}$.

At 408, the method 400 determines a reference voltage signal based on both of the forward path voltage signal and the estimated disturbance signal. For example, the processor 152 may execute instructions to implement the first adder 214 to compute the reference voltage signal $$\begin{bmatrix} v_{sd}^* \\ v_{sq}^* \end{bmatrix}$$

as a sum of the forward path voltage signal v_c and the estimated disturbance signal $\hat{v}_{dist}$.

At 410, the method 400 commands, based on the reference voltage signal, an inverter to apply an output voltage to the IM, thereby causing an output current to be generated in a stator winding of the IM. For example, the processor 152 may execute instructions to command the inverter 104 to produce the output voltage for application to the windings of the IM 102

The present disclosure provides a method for controlling an induction machine. The method includes: sensing a measured rotor position of the induction machine; determining a forward path voltage command based on: a command current, the measured rotor position, and a set of estimated motor parameters regarding the induction machine; determining an estimated disturbance signal corresponding to a voltage generated in the induction machine due to rotor fluxes; determining a reference voltage signal based on both of the forward path voltage command and the estimated disturbance signal; and commanding, based on the reference voltage signal, an inverter to apply an output voltage to the induction machine and thereby causing an output current to be generated in a stator winding of the induction machine.

In some embodiments, the method further includes determining an estimated rotor flux, and wherein determining the estimated disturbance signal includes determining the estimated disturbance signal based on the estimated rotor flux.

In some embodiments, determining the estimated rotor flux includes calculating, based on at least one phase current signal from a healthy current sensor, the estimated rotor flux.

In some embodiments, the method further includes determining, based on the estimated rotor flux, an estimated slip speed of the induction machine.

In some embodiments, the method further includes determining, based on the estimated slip speed of the induction machine, an estimated synchronous speed of the induction machine; and determining the forward path voltage command includes determining the forward path voltage command further based on the estimated synchronous speed of the induction machine.

In some embodiments, determining the estimated slip speed of the induction machine includes determining the estimated slip speed of the induction machine further based on a q-axis component of the command current.

In some embodiments, determining the estimated slip speed of the induction machine includes calculating the estimated slip speed of the induction machine in accordance with an equation:

$$\hat{\omega}_{slip} = \frac{\hat{L}_m}{\hat{\tau}_r} \frac{i_{sq}^*}{\hat{\psi}_{rd}},$$

where $\hat{\omega}_{slip}$ is the estimated slip speed of the induction machine, $\hat{L}_m$ is an estimated mutual inductance of the induction machine $\hat{\tau}_r$ is an estimated rotor time constant of the induction machine, $i^*_{sq}$ is the q-axis component of the command current, and $\hat{\psi}_{rd}$ is the estimated d-axis rotor flux.

In some embodiments, the estimated rotor flux includes a d-axis rotor flux; and determining the estimated rotor flux includes determining the d-axis rotor flux based on: a d-axis component of the command current, and a second set of estimated motor parameters regarding the induction machine.

In some embodiments, determining the estimated rotor flux includes calculating the estimated d-axis rotor flux in accordance with an equation:

$$\hat{\psi}_{rd} = \frac{\hat{L}_m}{1 + \hat{\tau}_r \hat{s}_\psi} i_{sd}^*,$$

where $\hat{\psi}_{rd}$ is the estimated d-axis rotor flux, $\hat{L}_m$ is an estimated mutual inductance of the induction machine $\hat{\tau}_r$ is an estimated rotor time constant of the induction machine, $\hat{s}_\psi$ is an approximate discrete implementation of the derivative operator, and $i^*_{ds}$ is the d-axis component of the command current.

In some embodiments, determining the forward path voltage signal includes applying to the command current, a transfer matrix:

$$\begin{bmatrix} \hat{\sigma}\hat{L}_s\hat{s} + \hat{r}_\sigma & -\hat{\omega}_s\hat{\sigma}\hat{L}_s \\ \hat{\omega}_s\hat{\sigma}\hat{L}_s & \hat{\sigma}\hat{L}_s\hat{s} + \hat{r}_\sigma \end{bmatrix},$$

where $\hat{\sigma}\hat{L}_S$ is an estimated leakage inductance, $\hat{\sigma}\hat{L}_s\hat{s}$ is an estimated discrete time derivative of the estimated leakage inductance, $\hat{r}_\sigma$ is an estimated leakage resistance, and $\hat{\omega}_s$ is the estimated synchronous speed of the induction machine.

In some embodiments, the method further includes determining at least one current sensor having a faulted condition; and the commanding the inverter to apply the output voltage, based on the reference voltage signal, to the induction machine is performed in response to the at least one current sensor having the faulted condition.

The present disclosure also provides a system for controlling an induction machine. The system includes a controller. The controller is configured to: determine a forward path voltage command based on: a command current, a measured rotor position, and a set of estimated motor parameters regarding the induction machine; determine an estimated disturbance signal corresponding to a voltage generated in the induction machine due to rotor fluxes; determine a reference voltage signal based on both of the forward path voltage command and the estimated disturbance signal; and command, based on the reference voltage signal, an inverter to apply an output voltage to the induction machine and thereby causing an output current to be generated in a stator winding of the induction machine.

In some embodiments, the controller is further configured to determine an estimated rotor flux, and wherein the estimated disturbance signal is further determined based on the estimated rotor flux.

In some embodiments, the estimated rotor flux is determined based on at least one phase current signal from a healthy current sensor.

In some embodiments, the controller is further configured to determine, based on the estimated rotor flux, an estimated slip speed of the induction machine.

In some embodiments, the controller is further configured to determine, based on the estimated slip speed of the induction machine, an estimated synchronous speed of the induction machine, and the controller is further configured to determine the forward path voltage command further based on the estimated synchronous speed of the induction machine.

In some embodiments, the controller is further configured to determine the estimated slip speed of the induction machine further based on a q-axis component of the command current.

In some embodiments, the estimated rotor flux includes a d-axis rotor flux; and the controller is further configured to determine the d-axis rotor flux based on: a d-axis component of the command current, and a second set of estimated motor parameters regarding the induction machine.

In some embodiments, the controller is further configured to determine the forward path voltage signal by applying to the command current, a transfer matrix:

$$\begin{bmatrix} \hat{\sigma}\hat{L}_s\hat{s} + \hat{r}_\sigma & -\hat{\omega}_s\hat{\sigma}\hat{L}_s \\ \hat{\omega}_s\hat{\sigma}\hat{L}_s & \hat{\sigma}\hat{L}_s\hat{s} + \hat{r}_\sigma \end{bmatrix},$$

where $\hat{\sigma}\hat{L}_s$ is an estimated leakage inductance, $\hat{\sigma}\hat{L}_s\hat{s}$ is an estimated discrete time derivative of the estimated leakage inductance, $\hat{r}_\sigma$ is an estimated leakage resistance, and $\hat{\omega}_s$ is the estimated synchronous speed of the induction machine.

In some embodiments, the controller is further configured to: determine at least one current sensor having a faulted condition, and the controller is further configured to perform the commanding the inverter to apply the output voltage based on the reference voltage signal in response the at least one current sensor having the faulted condition.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for controlling an induction machine, the method comprising:

sensing a measured rotor position of the induction machine;

determining a forward path voltage command based on: a command current, the measured rotor position, and a set of estimated motor parameters regarding the induction machine;

determining an estimated disturbance signal corresponding to a voltage generated in the induction machine due to rotor fluxes;

determining a reference voltage signal based on both of the forward path voltage command and the estimated disturbance signal; and commanding, based on the reference voltage signal, an inverter to apply an output voltage to the induction machine and thereby causing an output current to be generated in a stator winding of the induction machine.

2. The method of claim 1, further comprising determining an estimated rotor flux, and wherein determining the estimated disturbance signal includes determining the estimated disturbance signal based on the estimated rotor flux.

3. The method of claim 2, wherein determining the estimated rotor flux includes calculating, based on at least one phase current signal from a healthy current sensor, the estimated rotor flux.

4. The method of claim 2, further comprising determining, based on the estimated rotor flux, an estimated slip speed of the induction machine.

5. The method of claim 4, further comprising determining, based on the estimated slip speed of the induction machine, an estimated synchronous speed of the induction machine, and wherein determining the forward path voltage command includes determining the forward path voltage command further based on the estimated synchronous speed of the induction machine.

6. The method of claim 4, wherein determining the estimated slip speed of the induction machine includes determining the estimated slip speed of the induction machine further based on a q-axis component of the command current.

7. The method of claim 4, wherein determining the estimated slip speed of the induction machine includes calculating the estimated slip speed of the induction machine in accordance with an equation:

$$\hat{\omega}_{slip} = \frac{\hat{L}_m}{\hat{\tau}_r} \frac{i^*_{sq}}{\hat{\psi}_{rd}},$$

where $\hat{\omega}_{slip}$ is the estimated slip speed of the induction machine, $\hat{L}_m$ is an estimated mutual inductance of the induction machine $\hat{\tau}_r$ is an estimated rotor time constant of the induction machine, $i^*_{sq}$ is the q-axis component of the command current, and $\hat{\psi}_{rd}$ is the estimated d-axis rotor flux.

8. The method of claim 2, wherein the estimated rotor flux includes a d-axis rotor flux; and wherein determining the estimated rotor flux includes determining the d-axis rotor flux based on: a d-axis component of the command current, and a second set of estimated motor parameters regarding the induction machine.

9. The method of claim 8, wherein determining the estimated rotor flux includes calculating the estimated d-axis rotor flux in accordance with an equation:

$$\hat{\psi}_{rd} = \frac{\hat{L}_m}{1 + \hat{\tau}_r \hat{s}_\psi} i^*_{sd},$$

where $\hat{\psi}_{rd}$ is the estimated d-axis rotor flux, $\hat{L}_m$ is an estimated mutual inductance of the induction machine $\hat{\tau}_r$ is an estimated rotor time constant of the induction machine, $\hat{s}_\psi$ is an approximate discrete implementation of the derivative operator, and $i^*_{ds}$ is the d-axis component of the command current.

10. The method of claim 1, wherein determining the forward path voltage signal includes applying to the command current, a transfer matrix:

$$\begin{bmatrix} \hat{\sigma}\hat{L}_s\hat{s} + \hat{r}_\sigma & -\hat{\omega}_s\hat{\sigma}\hat{L}_s \\ \hat{\omega}_s\hat{\sigma}\hat{L}_s & \hat{\sigma}\hat{L}_s\hat{s} + \hat{r}_\sigma \end{bmatrix},$$

where $\hat{\sigma L}_S$ is an estimated leakage inductance, $\hat{\sigma L}_s \hat{s}$ is an estimated discrete time derivative of the estimated leakage inductance, $\hat{r}_\sigma$ is an estimated leakage resistance, and $\hat{\omega}_s$ is the estimated synchronous speed of the induction machine.

11. The method of claim 1, further comprising determining at least one current sensor having a faulted condition, and wherein the commanding the inverter to apply the output voltage, based on the reference voltage signal, to the induction machine is performed in response to the at least one current sensor having the faulted condition.

12. A system for controlling an induction machine, the system comprising:

a controller configured to:

determine a forward path voltage command based on: a command current, a measured rotor position, and a set of estimated motor parameters regarding the induction machine;

determine an estimated disturbance signal corresponding to a voltage generated in the induction machine due to rotor fluxes;

determine a reference voltage signal based on both of the forward path voltage command and the estimated disturbance signal; and command, based on the reference voltage signal, an inverter to apply an output voltage to the induction machine and thereby causing an output current to be generated in a stator winding of the induction machine.

13. The system of claim 12, wherein the controller is further configured to determine an estimated rotor flux, and wherein the estimated disturbance signal is further determined based on the estimated rotor flux.

14. The system of claim 13, wherein the estimated rotor flux is determined based on at least one phase current signal from a healthy current sensor.

15. The system of claim 13, wherein the controller is further configured to determine, based on the estimated rotor flux, an estimated slip speed of the induction machine.

16. The system of claim 15, wherein the controller is further configured to determine, based on the estimated slip speed of the induction machine, an estimated synchronous speed of the induction machine, and wherein the controller is further configured to determine the forward path voltage command further based on the estimated synchronous speed of the induction machine.

17. The system of claim 15, wherein the controller is further configured to determine the estimated slip speed of the induction machine further based on a q-axis component of the command current.

18. The system of claim 13, wherein the estimated rotor flux includes a d-axis rotor flux; and wherein the controller is further configured to determine the d-axis rotor flux based on: a d-axis component of the command current, and a second set of estimated motor parameters regarding the induction machine.

19. The system of claim 12, wherein the controller is further configured to determine the forward path voltage signal by applying to the command current, a transfer matrix:

$$\begin{bmatrix} \hat{\sigma}\hat{L}_s\hat{s} + \hat{r}_\sigma & -\hat{\omega}_s\hat{\sigma}\hat{L}_s \\ \hat{\omega}_s\hat{\sigma}\hat{L}_s & \hat{\sigma}\hat{L}_s\hat{s} + \hat{r}_\sigma \end{bmatrix},$$

where $\hat{\sigma L}_S$ is an estimated leakage inductance, $\hat{\sigma L}_s\hat{s}$ is an estimated discrete time derivative of the estimated leakage inductance, $\hat{r}_\sigma$ is an estimated leakage resistance, and $\omega_s$ is the estimated synchronous speed of the induction machine.

20. The system of claim 12, wherein the controller is further configured to: determine at least one current sensor having a faulted condition, and wherein the controller is further configured to perform the commanding the inverter to apply the output voltage based on the reference voltage signal in response to the at least one current sensor having the faulted condition.

\* \* \* \* \*